United States Patent
Ahirwar et al.

(10) Patent No.: US 10,666,303 B1
(45) Date of Patent: May 26, 2020

(54) SPURIOUS SIGNAL CANCELLATION IN RADIO FREQUENCY TRANSMITTERS

(71) Applicant: NXP USA, Inc., Austin, TX (US)

(72) Inventors: Vijay Ahirwar, Madhya Pradesh (IN); Nilesh Khude, Pune (IN)

(73) Assignee: NXP USA, Inc., Austin, TX (US)

(*) Notice: Subject to any disclaimer, the term of this patent is extended or adjusted under 35 U.S.C. 154(b) by 0 days.

(21) Appl. No.: 16/175,563

(22) Filed: Oct. 30, 2018

Related U.S. Application Data (60) Provisional application No. 62/657,482, filed on Apr. 13, 2018.

(51) Int. Cl.
*H04B 1/04* (2006.01)

(52) U.S. Cl.
CPC .................. *H04B 1/0475* (2013.01)

(58) Field of Classification Search
CPC .............. H04B 1/0475; H04B 7/18517; H04B 2001/0408; H03F 1/32; H03F 1/3223; H03F 3/24; H04L 27/04; H04L 27/12; H04L 27/366
See application file for complete search history.

(56) References Cited

U.S. PATENT DOCUMENTS

| | | | | |
|---|---|---|---|---|
| 5,751,153 A | * | 5/1998 | Bockelman | G01R 1/06772 324/612 |
| 2003/0045249 A1 | * | 3/2003 | Nielsen | H03C 3/40 455/118 |
| 2009/0279641 A1 | * | 11/2009 | Aoki | H03F 1/3258 375/298 |

* cited by examiner

*Primary Examiner* — Nhan T Le (57) ABSTRACT

Spurious signals are cancelled in a radio frequency (RF) transmitter. According to one method, a first baseband signal is fed into a first input port of an RF mixer of the RF transmitter, a carrier signal is fed into a second input port of the RF mixer, and an RF spurious signal is measured at an output port of the RF mixer. A baseband compensation signal is generated based on the first baseband signal and the RF spurious signal, and a modified baseband signal is generated by subtracting the baseband compensation signal from the first baseband signal. The modified baseband signal, instead of the first baseband signal, is fed into the first input port of the RF mixer.

20 Claims, 6 Drawing Sheets

SPURIOUS SIGNAL CANCELLATION IN RADIO FREQUENCY TRANSMITTERS

CROSS-REFERENCE TO RELATED APPLICATION

This claims the benefit under 35 U.S.C. § 119(e) of commonly assigned U.S. Provisional Patent Application No. 62/657,482, filed on Apr. 13, 2018, which is hereby incorporated by reference herein in its entirety.

FIELD OF USE

This disclosure relates to radio frequency (RF) transmitter circuitry, and specifically, to systems and methods for cancelling spurious signals in an RF transmitter.

BACKGROUND OF THE INVENTION

The background description provided herein is for the purpose of generally presenting the context of the disclosure. Work of the inventors hereof, to the extent the work is described in this background section, as well as aspects of the description that do not otherwise qualify as prior art at the time of filing, are neither expressly nor impliedly admitted to be prior art against the present disclosure.

Communication system radio frequency transmitters often have imperfect devices, such as RF mixers, which are used for frequency translation. For instance, in addition to up-converting a frequency of an input baseband signal to a desired carrier frequency, the RF mixer may generate one or more spurious signal replicas across undesired carrier frequencies or tones. Such spurious signal replicas may cause spurious signal interference, which degrades transmission signal quality.

SUMMARY

Implementations of the present disclosure provide systems and methods for cancelling spurious signals in a radio frequency (RF) transmitter. According to one illustrative method, a carrier signal is fed into a first input port of an RF mixer, and an RF spurious signal is measured at an output port of the RF mixer. A baseband compensation signal is generated based on the RF spurious signal, and a modified baseband signal is generated by subtracting the baseband compensation signal from a first baseband signal. The modified baseband signal, instead of the first baseband signal, is fed into a second input port of the RF mixer.

In some aspects, generating the baseband compensation signal includes (1) determining a frequency component of the RF spurious signal; (2) generating a local oscillator signal based on the frequency component; and (3) mixing the local oscillator signal with the first baseband signal to yield the baseband compensation signal.

In other aspects, the carrier signal has a carrier frequency and determining the frequency component of the RF spurious signal includes (1) determining a peak amplitude of the RF spurious signal; (2) determining an RF frequency corresponding to the peak amplitude of the RF spurious signal; and (3) subtracting the carrier frequency from the RF frequency of the RF spurious signal to yield the frequency component of the RF spurious signal.

As another example, generating the baseband compensation signal may include (1) determining a frequency component of the RF spurious signal; (2) determining an amplitude of the RF spurious signal; (3) generating a local oscillator signal based on the frequency component; (4) mixing, using a second mixer, the local oscillator signal with the first baseband signal; and (5) scaling an output of the second mixer using an amplifier having a scaling factor corresponding to the determined amplitude to yield the generated baseband compensation signal.

In some aspects, the RF spurious signal is a first RF spurious signal of a plurality of RF spurious signals and the baseband compensation signal is a first baseband compensation signal of a plurality of baseband compensation signals. The method further includes measuring a second RF spurious signal of the plurality of RF spurious signals and generating a second baseband compensation signal based on the second RF spurious signal. Generating the modified baseband signal further includes subtracting the second baseband compensation signal from the first baseband signal.

In yet another example, generating the baseband compensation signal includes (1) determining a first frequency component of the first RF spurious signal and a second frequency component of the second RF spurious signal; (2) generating a first local oscillator signal based on the first frequency component and a second local oscillator signal based on the second frequency component; (3) mixing, via a second mixer, the first local oscillator signal with the first baseband signal to yield the first baseband compensation signal; and (4) mixing, via a third mixer, the second local oscillator signal with the first baseband signal to yield the second baseband compensation signal.

According to another aspect, the carrier signal has a carrier frequency and generating the baseband compensation signal includes determining a first frequency component of the first RF spurious signal and a second frequency component of the second RF spurious signal. Determining the first frequency component of the RF spurious signal includes (1) determining a peak amplitude of the first RF spurious signal; (2) determining a first RF frequency corresponding to the peak amplitude of the first RF spurious signal; and (3) subtracting the carrier frequency from the first RF frequency of the first RF spurious signal to yield the frequency component of the first RF spurious signal. Determining the second frequency component of the second RF spurious signal includes (1) determining a peak amplitude of the second RF spurious signal; (2) determining a second RF frequency corresponding to the peak amplitude of the second RF spurious signal; and (3) subtracting the carrier frequency from the second RF frequency of the second RF spurious signal to yield the frequency component of the second RF spurious signal.

In a further example, generating the first baseband compensation signal includes (1) determining a frequency component of the first RF spurious signal; (2) determining an amplitude of the first RF spurious signal; (3) generating a first local oscillator signal based on the frequency component of the first RF spurious signal; (4) mixing, using a second mixer, the first local oscillator signal with the first baseband signal; and (5) scaling an output of the second mixer using a first amplifier having a scaling factor corresponding to the amplitude of the first RF spurious signal to yield the first generated baseband compensation signal. Generating the second baseband compensation signal includes (1) determining a frequency component of the second RF spurious signal; (2) determining an amplitude of the second RF spurious signal; (3) generating a second local oscillator signal based on the frequency component of the second RF spurious signal; (4) mixing, using a third mixer, the second local oscillator signal with the first baseband signal; and (5) scaling an output of the third mixer using a second amplifier having a scaling factor corresponding to the amplitude of the second RF spurious signal to yield the second generated baseband compensation signal.

In some aspects, the measuring the RF spurious signal includes measuring the RF spurious signal offline using a test measurement port coupled to the output port of the RF mixer. In other aspects, the measuring the RF spurious signal includes measuring the RF spurious signal online using a loopback measurement module coupled to the output port of the RF mixer.

According to another aspect, an illustrative system for cancelling spurious signals in an RF transmitter includes an RF mixer, an RF spurious signal measurement module, a baseband compensation signal generator, and a modified baseband signal generator. The RF mixer includes a first input port, a second input port, and an output port and is configured to (1) receive a carrier signal via the first input port, and (2) generate at the output port an RF spurious signal to be measured. The RF spurious signal measurement module is configured to measure the RF spurious signal at the output port of the RF mixer. The baseband compensation signal generator is configured to generate a baseband compensation signal based on the RF spurious signal. The modified baseband signal generator is configured to generate a modified baseband signal by subtracting the baseband compensation signal from the first baseband signal, and feed the modified baseband signal, instead of the first baseband signal, into a second input port of the RF mixer.

In some aspects, the baseband compensation signal generator includes a local oscillator, a signal processor, and a second mixer and is configured to generate the baseband compensation signal by (1) determining, using the signal processor, a frequency component of the RF spurious signal; (2) generating, using the local oscillator, a local oscillator signal based on the frequency component; and (3) mixing, using the second mixer, the local oscillator signal with the first baseband signal to yield the baseband compensation signal.

In a further example, the carrier signal has a carrier frequency and the signal generator is configured to determine the frequency component of the RF spurious signal by (1) determining a peak amplitude of the RF spurious signal; (2) determining an RF frequency corresponding to the peak amplitude of the RF spurious signal; and (3) subtracting the carrier frequency from the RF frequency of the RF spurious signal to yield the frequency component of the RF spurious signal.

In another aspect, the baseband compensation signal generator includes a signal processor, a local oscillator, a second mixer, and an amplifier. The baseband compensation signal generator is configured to generate the baseband compensation signal by (1) determining, using the signal processor, a frequency component of the RF spurious signal; (2) determining, using the signal processor, an amplitude of the RF spurious signal; (3) generating, using the local oscillator, a local oscillator signal based on the frequency component; (4) mixing, using the second mixer, the local oscillator signal with the first baseband signal; and (5) scaling, using the amplifier having a scaling factor corresponding to the determined amplitude, an output of the second mixer to yield the generated baseband compensation signal.

As a further example, the RF spurious signal may be a first RF spurious signal of a plurality of RF spurious signals, the baseband compensation signal may be a first baseband compensation signal of a plurality of baseband compensation signals, and the RF spurious signal measurement module may be further configured to measure a second RF spurious signal of the plurality of RF spurious signals. The system may further comprise a second baseband compensation signal generator configured to generate a second baseband compensation signal based on the second RF spurious signal. The modified baseband signal generator may be further configured to generate the modified baseband signal by subtracting the second baseband compensation signal from the first baseband signal.

In yet another aspect, the baseband compensation signal generator may include a signal processor, a first local oscillator, a second local oscillator, a second mixer, a third mixer, a first amplifier, and a second amplifier. Generating the baseband compensation signal may include (1) determining, using the signal processor, a first frequency component of the first RF spurious signal and a second frequency component of the second RF spurious signal; (2) generating, using the first local oscillator, a first local oscillator signal based on the first frequency component; (3) generating, using the second local oscillator, a second local oscillator signal based on the second frequency component; (4) mixing, via the second mixer, the first local oscillator signal with the first baseband signal to yield the first baseband compensation signal; and (5) mixing, via the third mixer, the second local oscillator signal with the first baseband signal to yield the second baseband compensation signal.

In some examples, the baseband compensation signal generator includes a signal processor, a first local oscillator, a second local oscillator, a second mixer, a third mixer, a first amplifier, and a second amplifier. The carrier signal has a carrier frequency and generating the baseband compensation signal includes determining, using the signal processor, a first frequency component of the first RF spurious signal by (1) determining a peak amplitude of the first RF spurious signal; (2) determining a first RF frequency corresponding to the peak amplitude of the first RF spurious signal; and (3) subtracting the carrier frequency from the first RF frequency of the first RF spurious signal to yield the frequency component of the first RF spurious signal. Generating the baseband compensation signal further includes determining, using the signal processor, a second frequency component of the second RF spurious signal by (1) determining a peak amplitude of the second RF spurious signal; (2) determining a second RF frequency corresponding to the peak amplitude of the second RF spurious signal; and (3) subtracting the carrier frequency from the second RF frequency of the second RF spurious signal to yield the frequency component of the second RF spurious signal.

In a further aspect, the baseband compensation signal generator includes a signal processor, a first local oscillator, a second local oscillator, a second mixer, a third mixer, a first amplifier, and a second amplifier. The carrier signal has a carrier frequency, and the baseband compensation signal generator is configured to generate the first baseband compensation signal by (1) determining, using the signal processor, a frequency component of the first RF spurious signal and an amplitude of the first RF spurious signal; (2) generating, using the first local oscillator, a first local oscillator signal based on the frequency component of the first RF spurious signal; (3) mixing, using the second mixer, the first local oscillator signal with the first baseband signal; and (4) scaling, using the first amplifier having a scaling factor corresponding to the amplitude of the first RF spurious signal, an output of the second mixer to yield the first generated baseband compensation signal. The baseband compensation signal generator is further configured to generate the second baseband compensation signal by (1) determining, using the signal processor, a frequency component of the second RF spurious signal and an amplitude of the second RF spurious signal; (2) generating, using the second local oscillator, a second local oscillator signal based on the frequency component of the second RF spurious signal; (3) mixing, using the third mixer, the second local oscillator signal with the first baseband signal; and (4) scaling, using the second amplifier having a scaling factor corresponding to the amplitude of the second RF spurious signal, an output of the third mixer to yield the second generated baseband compensation signal.

In some examples, the RF spurious signal measurement module includes a test measurement port coupled to the output port of the RF mixer and configured to provide the RF spurious signal for offline measurement. In other examples, the RF spurious signal measurement module is coupled to the output port of the RF mixer using a loopback path and is configured to measure the RF spurious signal online.

BRIEF DESCRIPTION OF THE DRAWINGS

Further features of the disclosure, its nature and various advantages will become apparent upon consideration of the following detailed description, taken in conjunction with the accompanying drawings, in which like reference characters refer to like parts throughout, and in which.

DETAILED DESCRIPTION

This disclosure describes methods and systems for spurious signal cancellation in RF transmitters. Specifically, according to the systems and related methods described herein, RF spurious signal cancellation is achieved by modifying an original baseband transmit signal based on one or more baseband compensation signals that are generated based on one or more RF spurious signal measurements.

Spurious signal replicas, such as those that may be caused by imperfect RF mixers, cause spurious signal interference and degrade transmission signal quality. High quality transmission signals are beneficial in facilitating efficient wireless communications at high speeds. It is therefore desirable to eliminate or mitigate such spurious signal replicas. According to the systems and methods described herein, RF spurious signal cancellation in an RF transmitter may be achieved by measuring the RF spurious signal at an output port of an RF mixer, generating a baseband compensation signal based on the measured RF spurious signal, modifying a baseband transmit signal based on the baseband compensation signal, and upconverting the modified baseband transmit signal instead of the original baseband transmit signal. By cancelling RF spurious signals, the presently described systems and methods facilitate efficient high speed wireless data communication.

Figure 1:
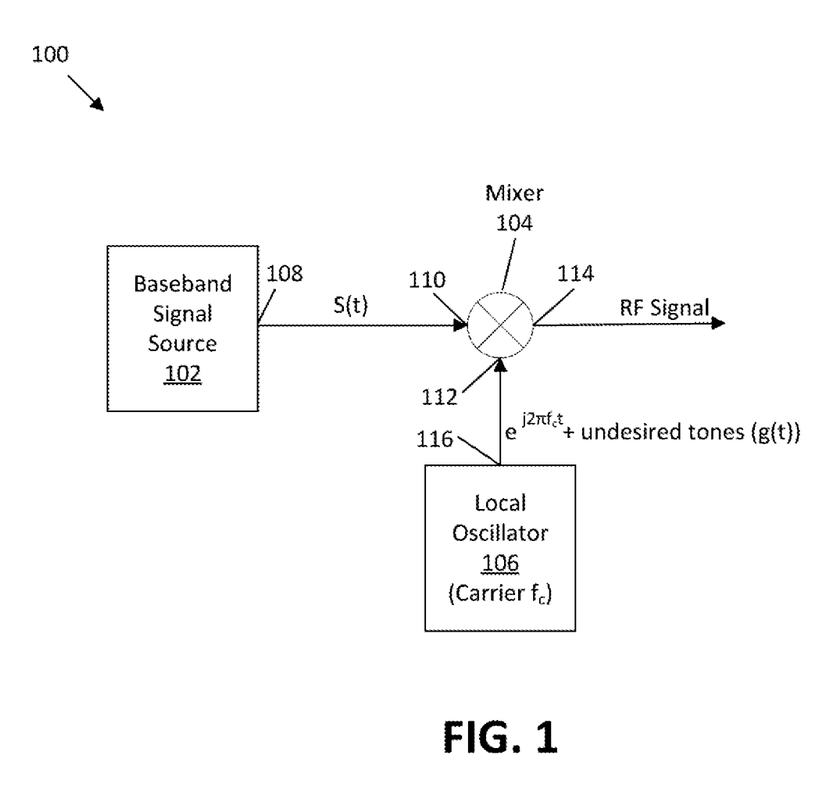
FIG. 1 depicts a previously known RF transmitter that generates one or more undesired signal replicas.

FIG. 1 is a block diagram illustrating a previously known RF transmitter 100 that generates one or more undesired signal replicas. RF transmitter 100 includes baseband signal source 102, mixer 104, and local oscillator 106. Baseband signal source 102 has output port 108, local oscillator 106 has output port 116, and mixer 104 has input port 110, input port 112, and output port 114. Baseband signal source 102 provides baseband signal (S(t)) to mixer 104 using a signal path from output port 108 to input port 110. Local oscillator 106 provides, to mixer 104 using a signal path from output port 116 to input port 112, a local oscillator signal ($e^{j2\pi f_c t}$) at carrier frequency ($f_c$) as well as one or more undesired tones (g(t)), which may stem from imperfections in the local oscillator or from other sources. Mixer 104 upconverts the baseband signal (S(t)) based on the local oscillator signal ($e^{j2\pi f_c t}$) and the one or more undesired tones (g(t)), thereby generating an RF signal at output port 114.

Figure 2:
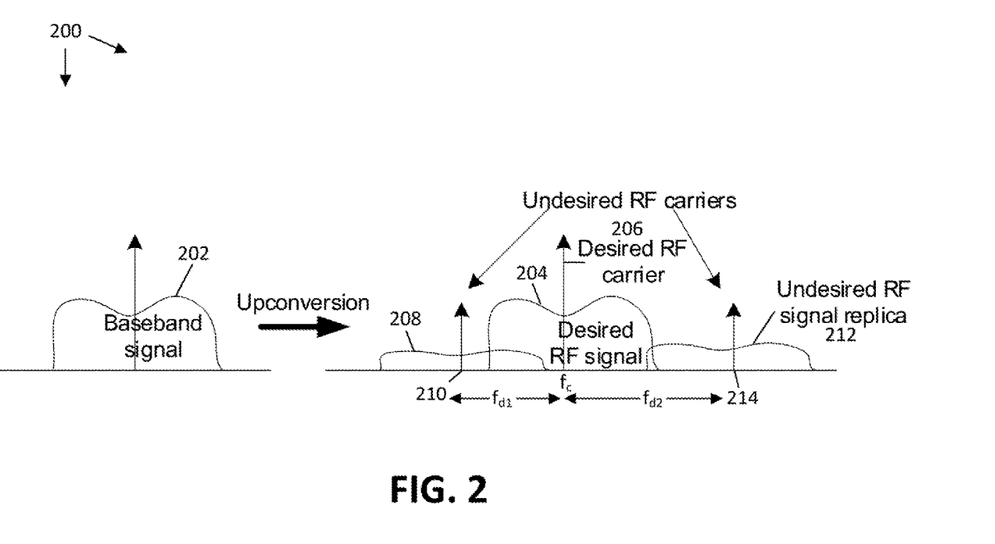
FIG. 2 shows a frequency-domain baseband signal and an upconverted RF signal along with undesired spurious signal replicas that may be generated by the RF transmitter of FIG. 1.

FIG. 2 shows a frequency-domain representation of the upconversion of baseband signal (S(t)), which may be performed by RF transmitter 100 of FIG. 1. In particular, a left portion of FIG. 2 includes a frequency-domain representation of the baseband signal (S(t)) 202 communicated along the path from output port 108 to input port 110, before the baseband signal (S(t)) 202 is upconverted to an RF signal. A right portion of FIG. 2 includes a frequency-domain representation of an RF signal 204, having desired RF carrier 206 ($f_c$), generated by mixer 104 at output port 114 based on the upconversion of the baseband signal (S(t)) received via input port 110 and the local oscillator signal ($e^{j2\pi f_c t}$) received via input port 112. The RF signal 204 (sometimes referred to herein as the desired RF signal) can be characterized by the following equation.

$$S(t)e^{j2\pi f_c t} \quad (1)$$

In addition to the RF signal 204, however, the upconversion of the baseband signal (S(t)) based on the one or more undesired tones (g(t)) received via input port 112 yields undesired signal replicas (sometimes referred to as RF spurious signals). The example of FIG. 2 shows frequency-domain representations of two undesired RF spurious signals (RF spurious signal 208 and RF spurious signal 212), which may be generated based on two undesired tones, which are offset from the carrier frequency ($f_c$) by frequency offsets $f_{d1}$ and $f_{d2}$, respectively, and which may form the undesired tones (g(t)) of FIG. 1. RF spurious signal 208 has undesired carrier 210, which is offset from the carrier frequency ($f_c$) by a first frequency offset ($f_{d1}$) and RF spurious signal 212 has undesired RF carrier 214, which is offset from the carrier frequency ($f_c$) by a second frequency offset ($f_{d2}$). RF spurious signal 208 may be characterized by the following equation.

$$A_{d1}S(t)e^{j2\pi(f_c+f_{d1})t} \quad (2)$$

RF spurious signal 212 may be characterized by the following equation.

$$A_{d2}S(t)e^{j2\pi(f_c+f_{d2})t} \quad (3)$$

Thus, the transmit signal from output port 114 may be characterized as the sum of desired RF signal 204 and undesired RF spurious signals 208 and 212.

$$S(t)e^{j2\pi f_c t}+A_{d1}S(t)e^{j2\pi(f_c+f_{d1})t}+A_{d2}S(t)e^{j2\pi(f_c+f_{d2})t} \quad (4)$$

As is apparent in FIG. 2, undesired RF spurious signal 208 and RF spurious signal 212 each have frequency ranges that overlap with the frequency range of RF signal 204. Undesired RF spurious signals 208 and 212 thus interfere with RF signal 204 and cause degradation in the RF signal quality. Further, because of their overlap in frequency range with RF signal 204, RF spurious signals 208 and 212 cannot be cancelled out merely by using frequency-based filtering.

Figure 3:
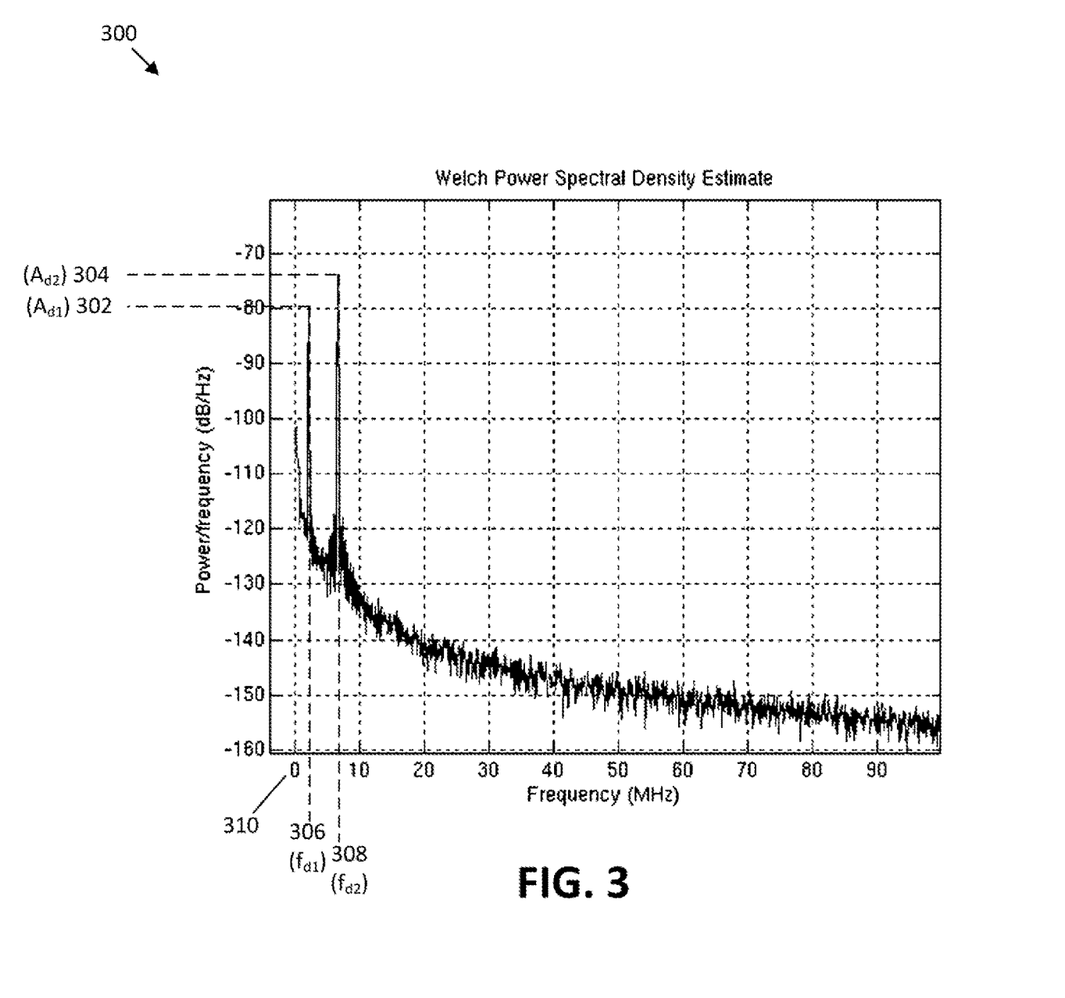
FIG. 3 shows a frequency response measurement taken at an output port of an RF transmitter, in accordance with an aspect of the present disclosure.

FIG. 3 shows a frequency response measurement 300 which may be taken at an output port of mixer 104, in accordance with an aspect of the present disclosure. The carrier is suppressed in the frequency response measurement 300, which is also keyed off of the carrier frequency ($f_c$), so the carrier frequency ($f_e$) is represented at the zero frequency mark 310. As is apparent in FIG. 3, the power magnitude of the frequency response 300 generally tapers off as frequency increases from the carrier frequency ($f_c$) mark 310, aside from two local peaks, which correspond to RF spurious signal 208 and RF spurious signal 212, respectively. In particular, the frequency response measurement 300 shows a first peak at frequency offset 306 ($f_{d1}$, which is approximately 2 MHz in this example) having a peak magnitude 302 ($A_{d1}$, which is approximately −80 dBc in this example) and a second peak at frequency offset 308 ($f_{d2}$, which is approximately 6.6 MHz in this example) having a peak magnitude 308 ($A_{d2}$, which is approximately −74 dBc in this example). As described in further detail below, in accordance with aspects of the present disclosure, a frequency response measurement, or more particularly, frequency offsets and corresponding peak magnitudes such as those described in connection with FIG. 3, may be employed to cancel RF spurious signals in an RF transmitter.

Figure 4:
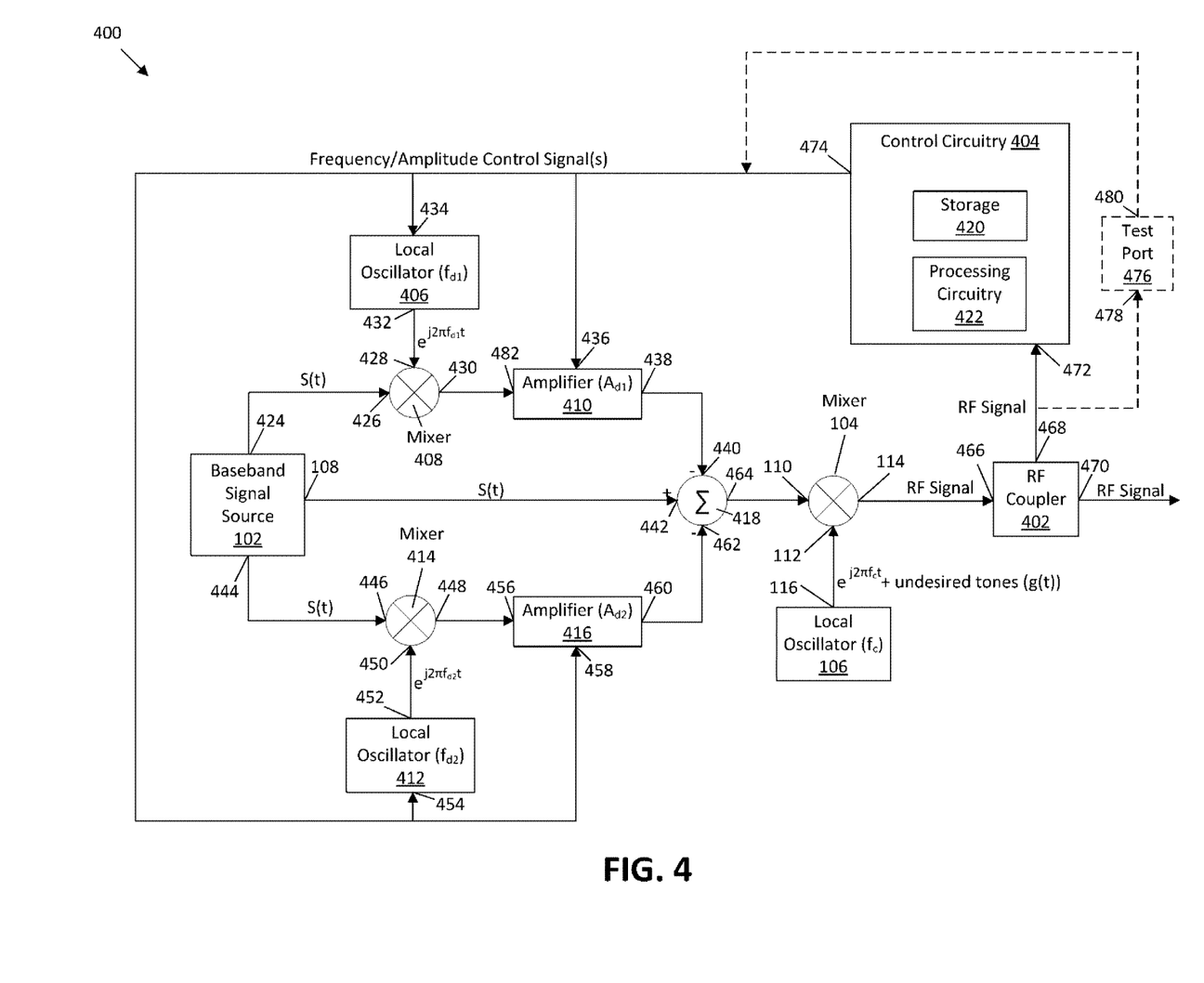
FIG. 4 depicts an illustrative RF transmitter with spurious signal cancellation, in accordance with an aspect of the present disclosure.

FIG. 4 depicts an illustrative RF transmitter 400 with spurious signal cancellation, in accordance with an aspect of the present disclosure. Baseband signal source 102, mixer 104, and local oscillator 106 are described above in the context of FIG. 1. In addition to those components, RF transmitter 400 includes RF coupler 402, control circuitry 404, local oscillators 406 and 412, mixers 408 and 414, amplifiers 410 and 416, and subtractor 418. Although FIG. 4 shows two sets of local oscillators, mixers, and amplifiers (e.g., the set including local oscillator 406, mixer 408, and amplifier 410, or the set including local oscillator 412, mixer 414, and amplifier 416), each such set corresponds to an RF spurious signal to be cancelled. As such, implementations of RF transmitter 400 that include fewer or greater than two sets of such components are contemplated within the scope of the present disclosure. Furthermore, although FIG. 4 shows RF transmitter including control circuitry 404, which may facilitate online RF spurious signal measurement and cancellation control (e.g., using a loopback whereby the RF transmit signal is fed back using the receive chain and a spectrum analysis is performed in baseband), in some implementations, RF transmitter 400 additionally or alternatively includes test port 476, which may facilitate offline RF spurious signal measurement and cancellation control (e.g., as part of calibration or testing of transmitter 400, during which transmitter output spectrum may be studied offline to measure undesired tones present in phase noise profile).

Figure 5:
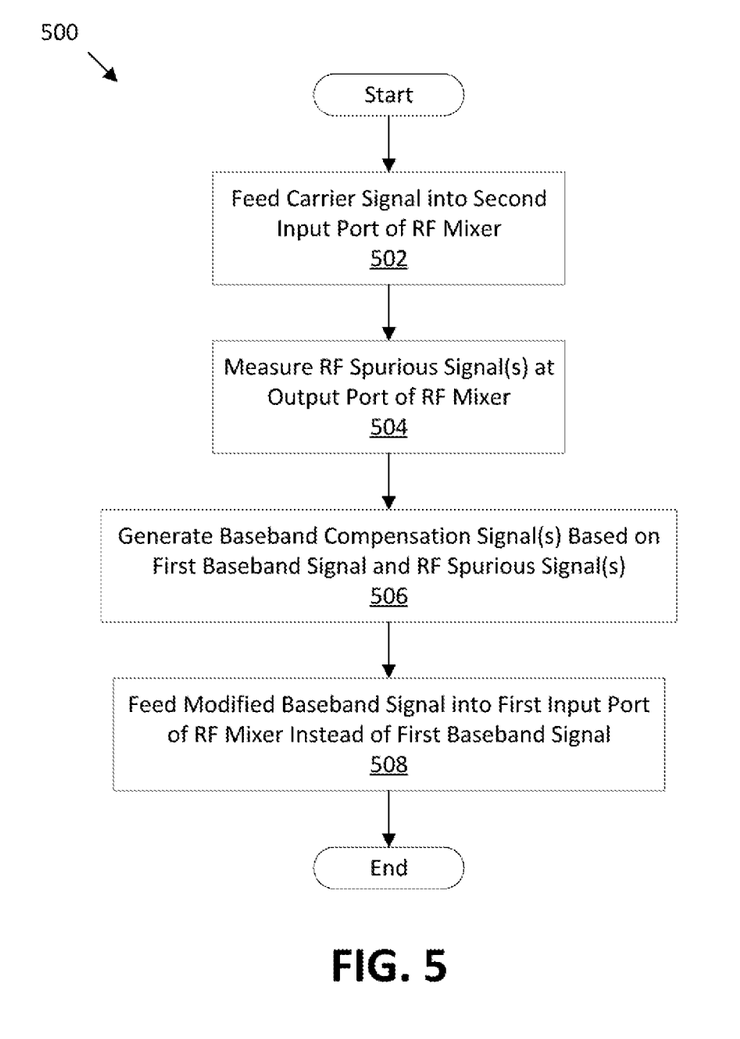
FIG. 5 shows an illustrative flowchart of a procedure for cancelling spurious signals in an RF transmitter, in accordance with an aspect of the present disclosure.
Figure 6:
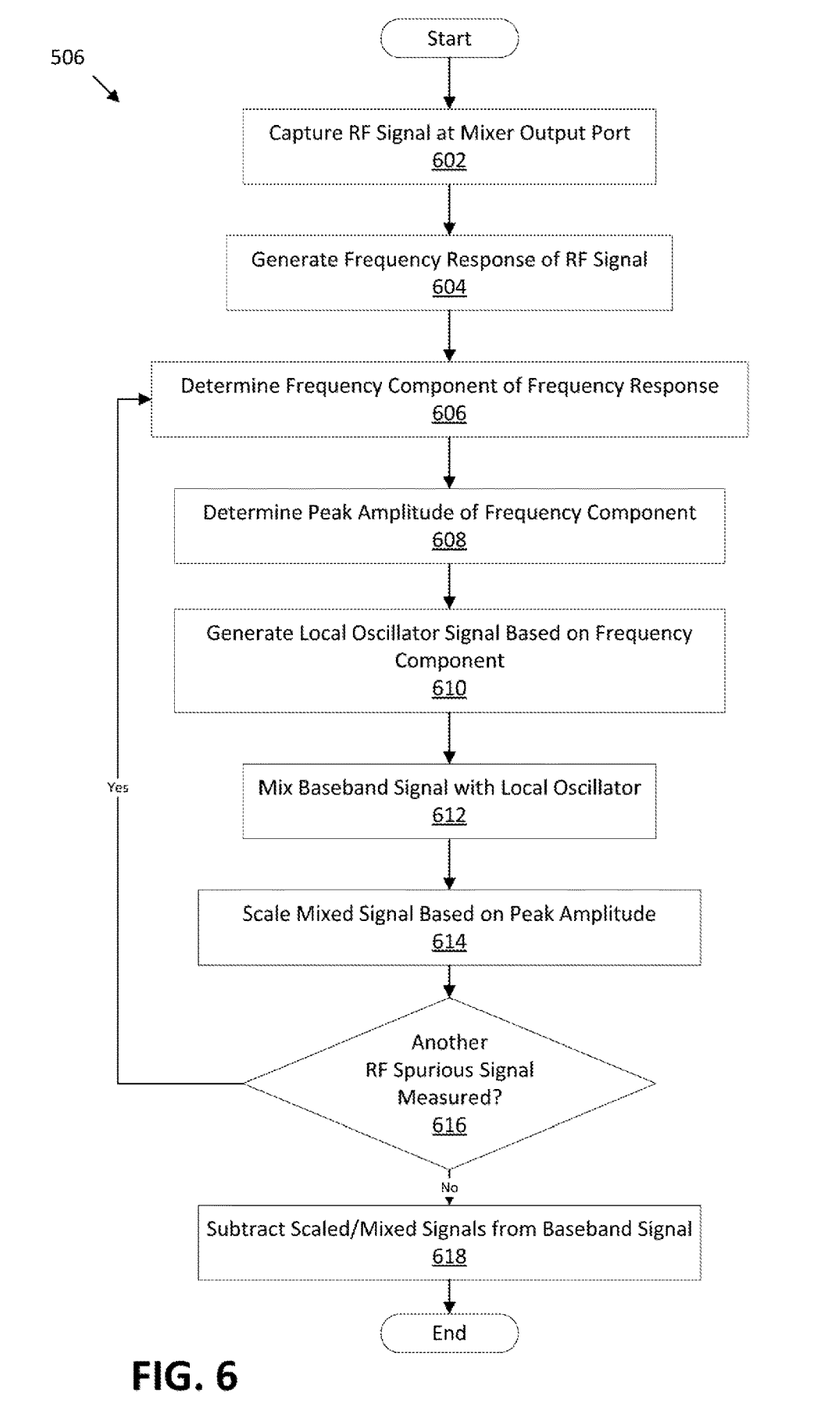
FIG. 6 is an illustrative flowchart of a procedure for generating a baseband compensation signal, in accordance with an aspect of the present disclosure.

As described in further detail in the context of FIG. 5 and FIG. 6, in some aspects RF transmitter 400 operates in two modes—an RF spurious signal measurement mode and an RF spurious signal cancellation mode. In the measurement mode, the sets of local oscillators, mixers, and amplifiers in RF transmitter 400 are inactive, and mixer 104 provides an unmodulated carrier signal (based on frequency $f_c$) at its output port 114 to facilitate measurement of RF spurious signals. In the cancellation mode, one or more of the sets of local oscillators, mixers, and amplifiers in RF transmitter 400 are active, and so subtractor 418 provides a modified baseband signal to mixer 104, instead of the original baseband signal (S(t)), to achieve RF spurious signal cancellation.

During measurement mode, RF coupler 402 receives an RF signal from mixer 104 using a path from output port 114 to input port 466, and splits the RF signal into two RF versions of the RF signal having the same information but at different power levels. RF coupler 402 provides one version of the RF signal to an antenna (not shown in FIG. 4) via an output port 470 of RF transmitter 400 and provides another version of the RF signal to control circuitry 404 using a path from output port 468 to input port 472. As described in further detail below in the context of FIG. 5 and FIG. 6, control circuitry 404 includes processing circuitry 422 (which may be a digital or analog signal processor, a microcontroller, a microprocessor, a field-programmable gate array (FPGA), or any other type of processing circuitry), which executes instructions stored in storage 420 to implement the functionality described herein, such as measuring RF spurious signals received via input port 472 during measurement mode and providing control signals for cancelling the measured RF spurious signals via output port 474 during cancellation mode. As mentioned above, in some implementations, RF coupler 402 provides, for offline RF spurious signal measurement, the second version of the RF signal to test port 474 using a path from output port 468 to input port 478. In such an example, test port 476 may also facilitate generation and/or insertion of control signals for cancelling measured RF spurious signals via output port 480.

As described in further detail below, during cancellation mode, control circuitry 404 (and/or test port 476, as the case may be) provides frequency and amplitude control signals to local oscillators 406 and 412 and amplifiers 410 and 416 for cancellation of RF spurious signals. In particular, control circuitry 404 provides a first frequency control signal (e.g., for cancellation of a first measured RF spurious signal) to local oscillator 406 using a path from output port 474 to input port 434, and provides a first amplitude control signal (e.g., for cancellation of the first measured RF spurious signal) to amplifier 410 using a path from output port 474 to input port 436. Similarly, control circuitry 404 provides a second frequency control signal (e.g., for cancellation of a second measured RF spurious signal) to local oscillator 412 using a path from output port 474 to input port 454 and provides a second amplitude control signal (e.g., for cancellation of the second measured RF spurious signal) to amplifier 416 using a path from output port 474 to input port 458.

Based on the frequency control signal provided by control circuitry 404, local oscillator 406 generates a first local oscillator signal ($e^{j2\pi f_{d1} t}$) at carrier frequency ($f_{d1}$), which corresponds to a frequency offset ($f_{d1}$) from a measured RF spurious signal. Local oscillator 406 then provides the first local oscillator signal to mixer 408 using a path from output port 432 to input port 428. Mixer 408 also receives the baseband signal (S(t)) from baseband signal source 402 using a path from output port 424 to input port 426, and generates a baseband compensation signal, which is provided to amplifier 410 using a path from output port 430 to input port 482. Based on the amplitude control signal provided by control circuitry 404, amplifier 410 scales the baseband compensation signal by a scaling factor ($A_{d1}$), which corresponds to a peak amplitude ($A_{d1}$) from a measured RF spurious signal, and provides the scaled baseband compensation signal (sometimes referred to herein as a modified baseband compensation signal) to port 440 of the subtractor 418. In some implementations, $A_{d1}$ and $A_{d2}$ may be complex numbers that capture the relative phase differences between the respective undesired carriers (offset by $f_{d1}$ and $f_{d2}$, respectively) and the desired carrier ($f_c$).

In a manner similar to that described above, based on the frequency control signal provided by control circuitry 404, local oscillator 412 generates a second local oscillator signal ($e^{j2\pi f_{d2} t}$) at carrier frequency ($f_{d2}$), which corresponds to a frequency offset ($f_{d2}$) from a second measured RF spurious signal. Local oscillator 412 then provides the second local oscillator signal to mixer 414 using a path from output port 452 to input port 450. Mixer 414 also receives the baseband signal (S(t)) from baseband signal source 402 using a path from output port 444 to input port 446, and generates a second baseband compensation signal, which is provided to amplifier 416 using a path from output port 448 to input port 456. Based on the amplitude control signal provided by control circuitry 404, amplifier 416 scales the baseband compensation signal by a scaling factor ($A_{d2}$), which corresponds to a peak amplitude ($A_{d2}$) from the second measured RF spurious signal, and provides the scaled baseband compensation signal (sometimes referred to herein as a modified baseband compensation signal) to port 462 of subtractor 418.

Baseband signal source 102 provides the baseband signal (S(t)) to port 442 of subtractor 418, and subtractor 418 subtracts the first modified baseband compensation signal (from port 440) and the second modified baseband compensation signal (from port 462) from the baseband signal (S(t)) (from port 442), and provides a modified baseband signal (S'(t)) to mixer 104, instead of the original baseband signal (S(t)), using a path from output port 464 to input port 110. The modified baseband signal (S'(t)) may be characterized by the following equation.

$$S'(t) = S(t) - A_{d1} S(t) e^{j2\pi f_{d1} t} - A_{d2} S(t) e^{j2\pi f_{d2} t} \quad (5)$$

Mixer 104 mixes the modified baseband signal (S'(t)) with the local oscillator signal ($e^{j2\pi f_c t}$) at carrier frequency ($f_c$) along with the one or more undesired tones (g(t)) to yield at output port 114 the modified RF transmit signal in which RF spurious signals are cancelled. The modified RF transmit signal may be characterized by the following equation.

$$S(t)e^{j2\pi f_c t} - A_{d1} A_{d1} S(t) e^{j2\pi (f_c + f_{d1} + f_{d1})t} - 2 A_{d1} A_{d2} S(t) e^{j2\pi (f_c + f_{d1} + f_{d2})t} - A_{d2} A_{d2} S(t) e^{j2\pi (f_c + f_{d2} + f_{d2})t} \quad (6)$$

Since the magnitudes of $A_{d1}$ and $A_{d2}$ are much less than one, the terms scaled by $A_{d1}$ and $A_{d2}$ are negligible, thus, achieving RF spurious signal cancellation.

FIG. 5 provides an example logic flow diagram illustrating aspects of procedure 500 for cancelling spurious signals in an RF transmitter, according to some implementations described herein. At 502, local oscillator 106 feeds, into mixer 104 using a path from port 116 to port 112, local oscillator signal ($e^{j2\pi f_c t}$) at carrier frequency ($f_c$) as well as one or more undesired tones (g(t)) that may be present. In some aspects, the baseband signal (S(t)) is suppressed (e.g., no input signal at port 110) during this measurement mode so that mixer 104 can generate an unmodulated transmitted output for measurement of RF spurious signals. At 504, control circuitry 404 (for instance, processing circuitry 422) receives a coupled portion of the unmodulated RF signal from mixer 104 using RF coupler 402, and measures any RF spurious signals that may be included therein. As described above, processing circuitry 422 may include digital signal processing components that can generate a frequency response (e.g., by using a Fast Fourier Transform (FFT) and/or the like) of the received RF signal, such as the frequency response 300 shown in FIG. 3, to facilitate measurement of RF spurious signals therein. At 506, processing circuitry 422 sends frequency and amplitude control signals to local oscillator 406 (and 412 if warranted based on a second RF spurious signal) and amplifier 410 (and 416 if warranted based on a second RF spurious signal), and the set of local oscillator 406, mixer 408, and amplifier 410 (and the set of local oscillator 406, mixer 408, and amplifier 410, if warranted based on a second RF spurious signal), along with subtractor 418, generate a baseband compensation signal in the manner described above. Additional details regarding how baseband compensation signal(s) may be generated are provided in the context of FIG. 6. At 508, subtractor 418 feeds the modified baseband signal into port 110 of mixer 104 instead of the original baseband signal (S(t)).

FIG. 6 provides an example logic flow diagram illustrating aspects of procedure 506 for generating a baseband compensation signal, according to some implementations described herein. At 602, RF coupler 402 captures an RF signal (which may be an unmodulated and/or carrier suppressed signal as described above) at output port 114 of mixer 104. At 604, processing circuitry 422 generates a frequency response of the captured RF signal in the manner described above. At 606, processing circuitry 422 determines a frequency component (e.g. a local or global peak) of the frequency response. At 608, processing circuitry 422 determines a peak amplitude of the frequency component determined at 606. At 610, processing circuitry 422 sends a frequency control signal to local oscillator 406 based on the frequency component determined at 606. For example, if processing circuitry 422 determined that the frequency response generated at 604 includes a peak at a frequency offset of $f_{d1}$, then processing circuitry 422 may send a frequency control signal causing local oscillator 406 to generate a local oscillator signal ($e^{j2\pi f_{d1} t}$) at carrier frequency ($f_{d1}$). At 612, mixer 408 mixes the baseband signal (S(t)) with the signal from local oscillator 406. At 614, processing circuitry 422 sends an amplitude control signal to amplifier 410 to cause amplifier 410 to scale the output from mixer 408 based on the peak amplitude determined at 608. For example, if processing circuitry 422 determined that the frequency response generated at 604 includes a frequency component having a peak amplitude of $A_{d1}$, then processing circuitry 422 may send a signal causing amplifier to scale the mixer output by a scaling amount $A_{d1}$.

At 616, processing circuitry 422 may determine whether the frequency response generated at 604 includes any additional RF spurious signals. If the frequency response generated at 604 includes an additional RF spurious signal ("Yes" at 616), then control passes back to 606 to process the additional RF spurious signal in the manner described above. If the frequency response generated at 604 does not include any additional RF spurious signal ("No" at 616), then control passes to 618. At 618, subtractor 418 subtracts the scaled output of amplifier 410 (and/or the scaled output from amplifier 416 if warranted based on another RF spurious signal) from the baseband signal (S(t)) to generate the modified baseband signal to be upconverted and transmitted to achieve RF spurious signal cancellation as described above.

Various implementations discussed in conjunction with FIGS. 1-6 are performed by various electronic components of one or more electronic circuits, such as but not limited to an integrated circuit, application-specific integrated circuit (ASIC), DSP, and/or the like. Various components discussed throughout this disclosure such as, but not limited to the devices shown in FIG. 1 and/or FIG. 4), and/or the like, are configured to include a set of electronic circuit components, and communicatively operate on one or more electronic circuits. Each electronic circuit is configured to include any of, but not limited to logic gates, memory cells, amplifiers, filters, and/or the like. Various implementations and components disclosed herein are configured to be at least partially operated and/or implemented by processor-executable instructions stored on one or more transitory or non-transitory processor-readable media.

While various implementations of the present disclosure have been shown and described herein, such implementations are provided using example only. Numerous variations, changes, and substitutions relating to implementations described herein are applicable without departing from the disclosure. It is noted that various alternatives to the implementations of the subject matter of the disclosure described herein may be employed in practicing the subject matter of the disclosure. It is intended that the following claims define the scope of the disclosure and that methods and structures within the scope of these claims and their equivalents be covered thereby.

While operations are depicted in the drawings in a particular order, this is not to be construed as requiring that such operations be performed in the particular order shown or in sequential order, or that all illustrated operations be performed to achieve the desirable results.

The subject matter of this specification has been described in terms of particular aspects, but other aspects can be implemented and are within the scope of the following claims. For example, the actions recited in the claims can be performed in a different order and still achieve desirable results. As one example, the processes depicted in FIG. 5 and FIG. 6 do not necessarily require the particular orders shown, or sequential order, to achieve desirable results. In certain implementations, multitasking and parallel processing may be advantageous. Other variations are within the scope of the following claims.

What is claimed is:

1. A method for cancelling spurious signals in a radio frequency (RF) transmitter, the method comprising:
   feeding a carrier signal into a first input port of an RF mixer;
   measuring an RF spurious signal at an output port of the RF mixer;
   generating a baseband compensation signal based on the RF spurious signal;
   generating a modified baseband signal by subtracting the baseband compensation signal from a first baseband signal; and
   feeding the modified baseband signal, instead of the first baseband signal, into a second input port of the RF mixer.

2. The method of claim 1, wherein the generating the baseband compensation signal comprises:
   determining a frequency component of the RF spurious signal;
   generating a local oscillator signal based on the frequency component; and
   mixing the local oscillator signal with the first baseband signal to yield the baseband compensation signal.

3. The method of claim 2, wherein the carrier signal has a carrier frequency and the determining the frequency component of the RF spurious signal comprises:
   determining a peak amplitude of the RF spurious signal;
   determining an RF frequency corresponding to the peak amplitude of the RF spurious signal; and
   subtracting the carrier frequency from the RF frequency of the RF spurious signal to yield the frequency component of the RF spurious signal.

4. The method of claim 1, wherein the generating the baseband compensation signal comprises:
   determining a frequency component of the RF spurious signal;
   determining an amplitude of the RF spurious signal;
   generating a local oscillator signal based on the frequency component;
   mixing, using a second mixer, the local oscillator signal with the first baseband signal;
   scaling an output of the second mixer using an amplifier having a scaling factor corresponding to the determined amplitude to yield the generated baseband compensation signal.

5. The method of claim 1, wherein the RF spurious signal is a first RF spurious signal of a plurality of RF spurious signals, the baseband compensation signal is a first baseband compensation signal of a plurality of baseband compensation signals, and the method further comprises:
   measuring a second RF spurious signal of the plurality of RF spurious signals; and
   generating a second baseband compensation signal based on the second RF spurious signal,
   wherein the generating the modified baseband signal further comprises subtracting the second baseband compensation signal from the first baseband signal.

6. The method of claim 5, wherein the generating the baseband compensation signal comprises:
   determining a first frequency component of the first RF spurious signal and a second frequency component of the second RF spurious signal;
   generating a first local oscillator signal based on the first frequency component and a second local oscillator signal based on the second frequency component;
   mixing, via a second mixer, the first local oscillator signal with the first baseband signal to yield the first baseband compensation signal; and
   mixing, via a third mixer, the second local oscillator signal with the first baseband signal to yield the second baseband compensation signal.

7. The method of claim 5, wherein the carrier signal has a carrier frequency and the generating the baseband compensation signal comprises:
   determining a first frequency component of the first RF spurious signal and a second frequency component of the second RF spurious signal,
   wherein the determining the first frequency component of the RF spurious signal comprises:
      determining a peak amplitude of the first RF spurious signal;
      determining a first RF frequency corresponding to the peak amplitude of the first RF spurious signal; and
      subtracting the carrier frequency from the first RF frequency of the first RF spurious signal to yield the frequency component of the first RF spurious signal; and
   wherein the determining the second frequency component of the second RF spurious signal comprises:
      determining a peak amplitude of the second RF spurious signal;
      determining a second RF frequency corresponding to the peak amplitude of the second RF spurious signal; and subtracting the carrier frequency from the second RF frequency of the second RF spurious signal to yield the frequency component of the second RF spurious signal.

8. The method of claim 5, wherein the generating the first baseband compensation signal comprises:
   determining a frequency component of the first RF spurious signal;
   determining an amplitude of the first RF spurious signal;
   generating a first local oscillator signal based on the frequency component of the first RF spurious signal;
   mixing, using a second mixer, the first local oscillator signal with the first baseband signal; and
   scaling an output of the second mixer using a first amplifier having a scaling factor corresponding to the amplitude of the first RF spurious signal to yield the first generated baseband compensation signal; and
   wherein the generating the second baseband compensation signal comprises:
   determining a frequency component of the second RF spurious signal;
   determining an amplitude of the second RF spurious signal;
   generating a second local oscillator signal based on the frequency component of the second RF spurious signal;
   mixing, using a third mixer, the second local oscillator signal with the first baseband signal; and
   scaling an output of the third mixer using a second amplifier having a scaling factor corresponding to the amplitude of the second RF spurious signal to yield the second generated baseband compensation signal.

9. The method of claim 1, wherein the measuring the RF spurious signal comprises measuring the RF spurious signal offline using a test measurement port coupled to the output port of the RF mixer.

10. The method of claim 1, wherein the measuring the RF spurious signal comprises measuring the RF spurious signal online using a loopback measurement module coupled to the output port of the RF mixer.

11. A system for cancelling spurious signals in a radio frequency (RF) transmitter, the system comprising:
   an RF mixer comprising a first input port, a second input port, and an output port, the RF mixer being configured to:
      receive a carrier signal via the first input port, and
      generate at the output port an RF spurious signal to be measured;
   an RF spurious signal measurement module configured to measure the RF spurious signal at the output port of the RF mixer;
   a baseband compensation signal generator configured to generate a baseband compensation signal based on the RF spurious signal;
   a modified baseband signal generator configured to:
      generate a modified baseband signal by subtracting the baseband compensation signal from a first baseband signal, and
      feed the modified baseband signal, instead of the first baseband signal, into a second input port of the RF mixer.

12. The system of claim 11, wherein the baseband compensation signal generator comprises a local oscillator, a signal processor, and a second mixer and is configured to generate the baseband compensation signal by:
   determining, using the signal processor, a frequency component of the RF spurious signal;
   generating, using the local oscillator, a local oscillator signal based on the frequency component; and
   mixing, using the second mixer, the local oscillator signal with the first baseband signal to yield the baseband compensation signal.

13. The system of claim 12, wherein the carrier signal has a carrier frequency and the signal generator is configured to determine the frequency component of the RF spurious signal by:
   determining a peak amplitude of the RF spurious signal;
   determining an RF frequency corresponding to the peak amplitude of the RF spurious signal; and
   subtracting the carrier frequency from the RF frequency of the RF spurious signal to yield the frequency component of the RF spurious signal.

14. The system of claim 11, wherein the baseband compensation signal generator comprises a signal processor, a local oscillator, a second mixer, and an amplifier and is configured to generate the baseband compensation signal by:
   determining, using the signal processor, a frequency component of the RF spurious signal;
   determining, using the signal processor, an amplitude of the RF spurious signal;
   generating, using the local oscillator, a local oscillator signal based on the frequency component;
   mixing, using the second mixer, the local oscillator signal with the first baseband signal; and
   scaling, using the amplifier having a scaling factor corresponding to the determined amplitude, an output of the second mixer to yield the generated baseband compensation signal.

15. The system of claim 11, wherein the RF spurious signal is a first RF spurious signal of a plurality of RF spurious signals, the baseband compensation signal is a first baseband compensation signal of a plurality of baseband compensation signals,
   wherein the RF spurious signal measurement module is further configured to measure a second RF spurious signal of the plurality of RF spurious signals,
   wherein the system further comprises a second baseband compensation signal generator configured to generate a second baseband compensation signal based on the second RF spurious signal, and
   wherein the modified baseband signal generator is further configured to generate the modified baseband signal by subtracting the second baseband compensation signal from the first baseband signal.

16. The system of claim 15, wherein the baseband compensation signal generator comprises a signal processor, a first local oscillator, a second local oscillator, a second mixer, a third mixer, a first amplifier, and a second amplifier, wherein the generating the baseband compensation signal comprises:
   determining, using the signal processor, a first frequency component of the first RF spurious signal and a second frequency component of the second RF spurious signal;
   generating, using the first local oscillator, a first local oscillator signal based on the first frequency component;
   generating, using the second local oscillator, a second local oscillator signal based on the second frequency component;
   mixing, via the second mixer, the first local oscillator signal with the first baseband signal to yield the first baseband compensation signal; and
   mixing, via the third mixer, the second local oscillator signal with the first baseband signal to yield the second baseband compensation signal.

17. The system of claim 15, wherein the baseband compensation signal generator comprises a signal processor, a first local oscillator, a second local oscillator, a second mixer, a third mixer, a first amplifier, and a second amplifier, wherein the carrier signal has a carrier frequency and the generating the baseband compensation signal comprises:
   determining, using the signal processor, a first frequency component of the first RF spurious signal by:
      determining a peak amplitude of the first RF spurious signal;
      determining a first RF frequency corresponding to the peak amplitude of the first RF spurious signal; and
      subtracting the carrier frequency from the first RF frequency of the first RF spurious signal to yield the frequency component of the first RF spurious signal; and
   determining, using the signal processor, a second frequency component of the second RF spurious signal by:
      determining a peak amplitude of the second RF spurious signal;
      determining a second RF frequency corresponding to the peak amplitude of the second RF spurious signal; and
      subtracting the carrier frequency from the second RF frequency of the second RF spurious signal to yield the frequency component of the second RF spurious signal.

18. The system of claim 15, wherein the baseband compensation signal generator comprises a signal processor, a first local oscillator, a second local oscillator, a second mixer, a third mixer, a first amplifier, and a second amplifier, wherein the carrier signal has a carrier frequency, wherein the baseband compensation signal generator is configured to:
   generating the first baseband compensation signal by:
      determining, using the signal processor, a frequency component of the first RF spurious signal and an amplitude of the first RF spurious signal;
      generating, using the first local oscillator, a first local oscillator signal based on the frequency component of the first RF spurious signal;
      mixing, using the second mixer, the first local oscillator signal with the first baseband signal; and
      scaling, using the first amplifier having a scaling factor corresponding to the amplitude of the first RF spurious signal, an output of the second mixer to yield the first generated baseband compensation signal; and
   generate the second baseband compensation signal by:
      determining, using the signal processor, a frequency component of the second RF spurious signal and an amplitude of the second RF spurious signal;
      generating, using the second local oscillator, a second local oscillator signal based on the frequency component of the second RF spurious signal;
      mixing, using the third mixer, the second local oscillator signal with the first baseband signal; and
      scaling, using the second amplifier having a scaling factor corresponding to the amplitude of the second RF spurious signal, an output of the third mixer to yield the second generated baseband compensation signal.

19. The system of claim 11, wherein the RF spurious signal measurement module comprises a test measurement port coupled to the output port of the RF mixer and configured to provide the RF spurious signal for offline measurement.

20. The system of claim 11, wherein the RF spurious signal measurement module is coupled to the output port of the RF mixer using a loopback path and is configured to measure the RF spurious signal online.

* * * * *